(12) United States Patent   (10) Patent No.: US 7,768,888 B2
Suzuki                      (45) Date of Patent:     Aug. 3, 2010

(54) METHOD FOR DISCRIMINATING THE KIND OF OPTICAL DISK AND OPTICAL DISK APPARATUS USING THE SAME

(75) Inventor: Motoyuki Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 676 days.

(21) Appl. No.: 11/482,725

(22) Filed: Jul. 10, 2006

(65) Prior Publication Data

US 2007/0115781 A1    May 24, 2007

(30) Foreign Application Priority Data

Nov. 18, 2005  (JP) .............................. 2005-333562

(51) Int. Cl.
    *G11B 7/00*       (2006.01)
(52) U.S. Cl. ................. 369/53.2; 369/53.22; 369/44.23
(58) Field of Classification Search .................. None
See application file for complete search history.

(56) References Cited

U.S. PATENT DOCUMENTS

| 5,574,502 | A * | 11/1996 | Haruki .................. 348/347 |
| 6,240,054 | B1 * | 5/2001 | Takeya et al. ............ 369/44.29 |
| 2003/0185134 | A1 * | 10/2003 | Kimura et al. ......... 369/112.08 |
| 2004/0085885 | A1 * | 5/2004 | Kikuchi et al. ......... 369/112.24 |
| 2004/0190417 | A1 * | 9/2004 | Watanabe et al. ........ 369/53.11 |
| 2005/0047311 | A1 * | 3/2005 | Sato et al. ............. 369/112.02 |
| 2005/0083798 | A1 | 4/2005 | Fujiune et al. |
| 2005/0201248 | A1 * | 9/2005 | Kitabayashi et al. ... 369/112.01 |
| 2006/0239139 | A1 * | 10/2006 | Kataoka et al. .......... 369/44.23 |

FOREIGN PATENT DOCUMENTS

| JP | 2000-187927 | 7/2000 |
| JP | 2003-99970 | 4/2003 |
| JP | 2005-251352 | 9/2005 |
| WO | WO 03/063150 | 7/2003 |
| WO | WO 2005/059907 | 6/2005 |

OTHER PUBLICATIONS

Office Action issued in Japanese Patent Application No. 2005-333562 on Sep. 8, 2009.

* cited by examiner

*Primary Examiner*—Thang V Tran
*Assistant Examiner*—Carl Adams
(74) *Attorney, Agent, or Firm*—Antonelli, Terry, Stout & Kraus, LLP.

(57) ABSTRACT

An optical disk apparatus which can promptly restart reproduction and recording by using a preceding discrimination result of a disk kind without using a memory. A mechanism for correcting an aberration is constructed by an expander lens for the aberration correction and a self-holding element as a moving mechanism of the expander lens. A detector for detecting a position of the expander lens is provided. By detecting a correcting position of the expander lens, the kind of disk to which the reproduction and recording have previously been executed can be discriminated.

11 Claims, 8 Drawing Sheets

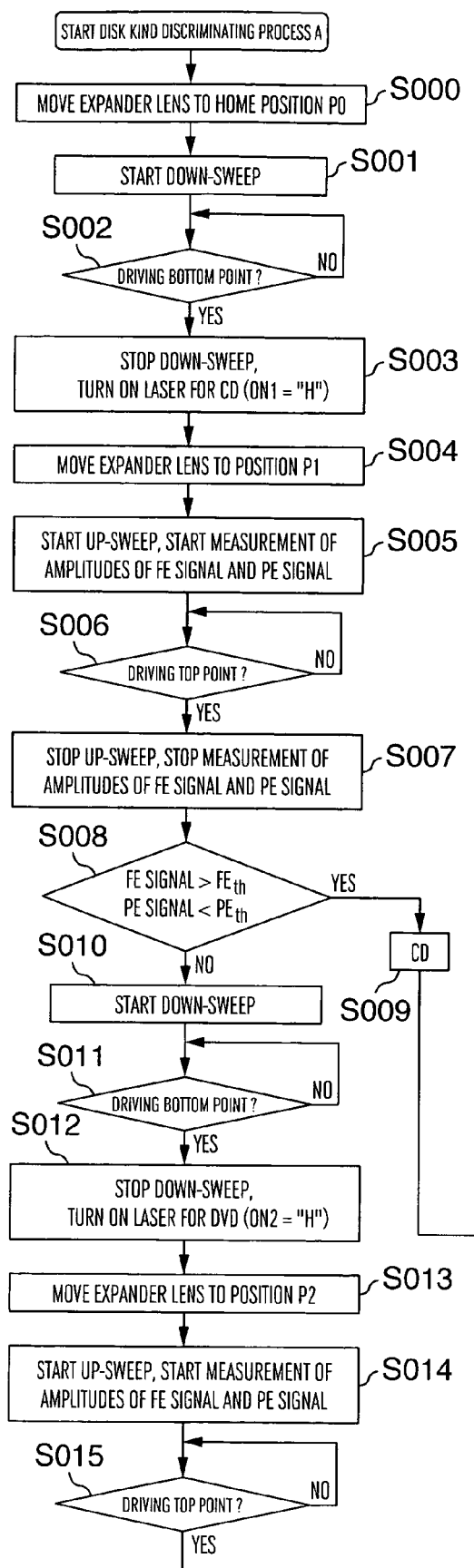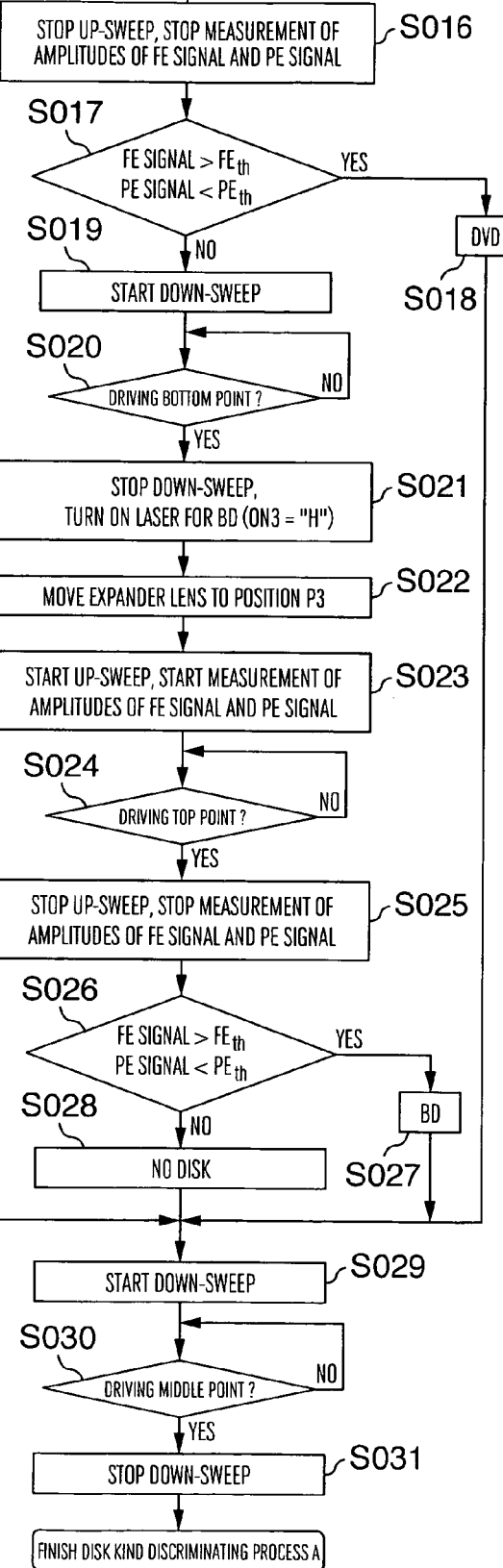
FIG.7

METHOD FOR DISCRIMINATING THE KIND OF OPTICAL DISK AND OPTICAL DISK APPARATUS USING THE SAME

INCORPORATION BY REFERENCE

The present application claims priority from Japanese application JP2005-333562 filed on Nov. 18, 2005, the content of which is hereby incorporated by reference into this application.

BACKGROUND OF THE INVENTION

The invention relates to a technique for discriminating a kind or type of loaded optical disk in an optical disk apparatus in which a plurality of kinds of optical disks are loaded.

In the case where the reproduction is interrupted when a movie, music, or the like is being reproduced by an optical disk apparatus and the reproduction is executed again, it is desirable that the reproduction can be promptly started.

In a conventional method of discriminating the kind of disk, there is such a problem that a time which is necessary to move an expander lens and a time which is necessary to vertically move an objective lens in the focusing direction are long, so that a time which is required to discriminate the kind of disk is long. Therefore, a method whereby the kind of disk which has previously been reproduced is stored into a memory has been proposed. For example, refer to JP-A-2000-187927 (pages 2 to 4, FIG. 2).

SUMMARY OF THE INVENTION

According to the above conventional method, since it is necessary to provide a memory for storing the kind of disk, there is such a problem that the number of parts increases and the costs rise. If a non-volatile memory whose stored contents are not erased even if a power source is turned off is used, there is a problem of restriction of the number of rewriting times of the memory.

The invention is, therefore, made in consideration of such conventional circumstances and it is an object of the invention to provide an optical disk apparatus which can promptly restart the reproduction by using a preceding discrimination result about the kind of disk without using a memory.

According to one aspect of the invention, the above object is accomplished by using a self-holding element as a moving mechanism of an expander lens, providing means for detecting a position of the expander lens, and discriminating a kind of disk from a result of the detection.

Preferably, the means for detecting the position of the expander lens is constructed by using a stepping motor as a moving mechanism of the expander lens and providing a detector for detecting a home position of the lens, and the position is detected on the basis of the number of steps from the home position of the expander lens.

Preferably, another means for detecting the position of the expander lens is constructed by using a piezoelectric element as a moving mechanism of the expander lens and the position is detected by a position sensor using a permanent magnet and a hall sensor.

With the constructions, the kind of disk to which the reproduction and recording have been executed can be discriminated without using the memory for storing the kind of disk. The reproduction and recording can be promptly restarted.

According to the embodiments of the invention, the kind of disk can be discriminated, the reproduction and recording can be promptly restarted, and use efficiency of the optical disk apparatus is improved.

Other objects, features and advantages of the invention will become apparent from the following description of the embodiments of the invention taken in conjunction with the accompanying drawings.

BRIEF DESCRIPTION OF THE DRAWINGS

FIG. 7 is a flowchart showing a disk kind discriminating process; and

DESCRIPTION OF THE EMBODIMENTS

A specific embodiment to which the invention is applied will be described in detail hereinbelow with reference to the drawings. It will be obviously understood that he invention is not limited to the following examples but various conditions can be arbitrarily changed within the scope of the invention without departing from the essence of the invention.

In a recording and reproducing apparatus of an optical recording medium, a spot size d on the recording medium is expressed by the following equation (1).

$$d = \lambda/NA \quad (1)$$

where, $\lambda$: wavelength of a laser beam
NA: numerical aperture of an objective lens As will be understood from the equation (1), the shorter the wavelength $\lambda$ of a light source is or the larger the numerical aperture NA of the objective lens is, the smaller the spot size d is, so that the high-density recording can be performed.

Therefore, to increase a recording capacity of the optical recording medium, in an optical pickup apparatus, it is necessary to use a semiconductor laser (LD) whose light emitting wavelength is shorter as a light source and use the objective lens whose numerical aperture (NA) is larger.

Therefore, in the technical field of a high-density optical disk system, an attention is paid to the standard (BD standard) in which a blue violet semiconductor laser whose light emitting wavelength is equal to 405 nm is used as a light source, an objective lens whose numerical aperture is equal to 0.85 is used, the recording capacity is increased to 25 GB (gigabytes) per plane, and a cover layer thickness of the recording medium is reduced to 100 μm in order to prevent a deterioration in performance due to the inclination of the recording medium.

A double-layer disk is also standardized and its cover layer thickness is equal to 75 μm. The cover layer thickness denotes a thickness from a light incident surface of the recording medium to an information recording surface.

Since a spherical aberration occurring in the optical system is proportional to the fourth power of the numerical aperture of the objective lens and is also proportional to a thickness error of the recording medium, in order to use the objective lens having the large numerical aperture of about 0.85, the recording medium has to have a unique thickness within a predetermined thickness error. However, it is extremely difficult to manufacture the recording medium whose thickness lies within such a predetermined thickness error. Even in the case of a predetermined thickness error which is permitted upon manufacturing, since the spherical aberration is large, it is necessary to correct the spherical aberration each time the disk is exchanged. Particularly, special correcting means which is not provided for the conventional DVDs and CDs (Compact Discs) is necessary for the spherical aberration occurring upon reproduction of the double-layer disk.

Figure 4:
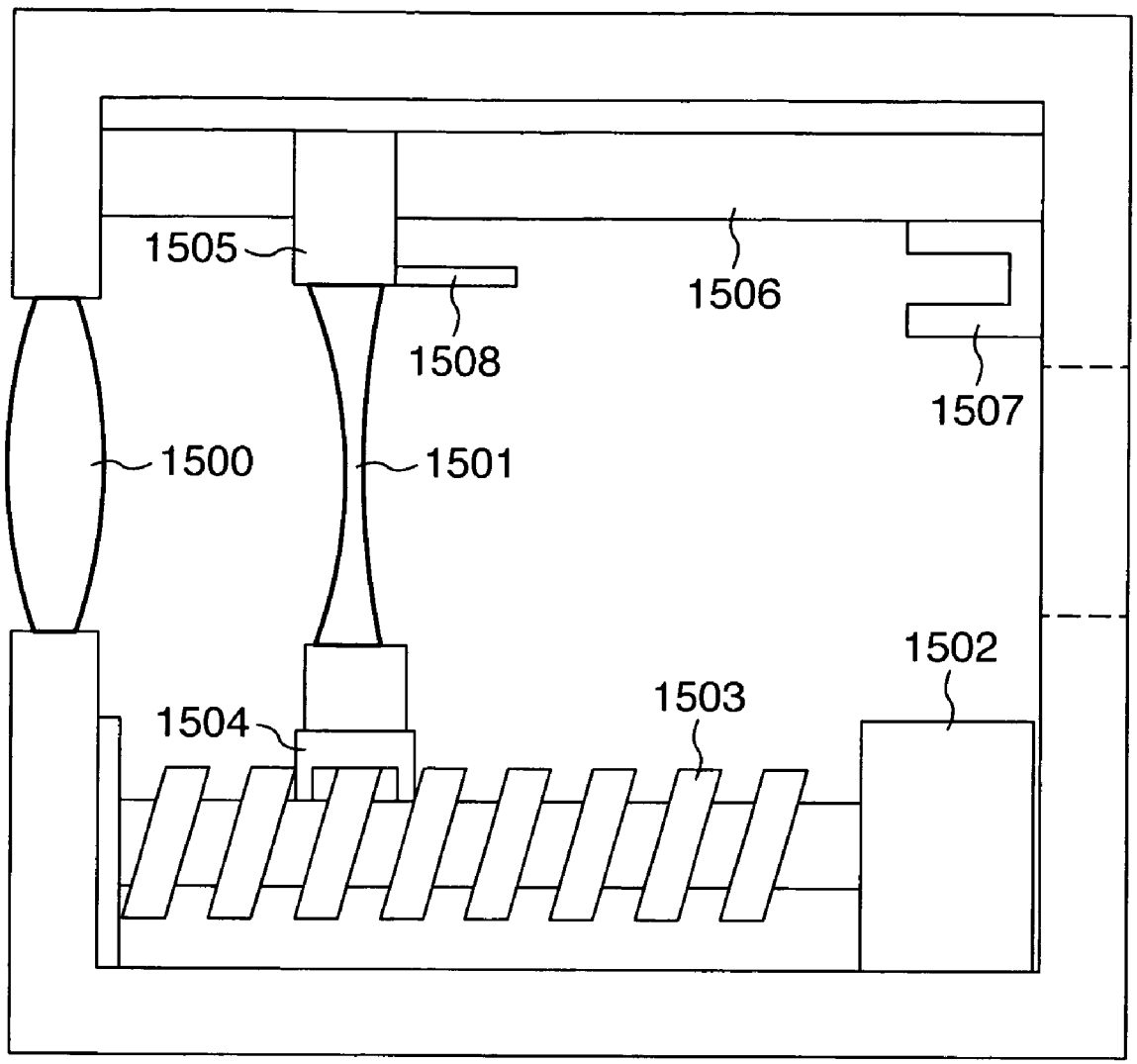
FIG. 4 is a diagram showing an example of a construction of an expander lens using a stepping motor.

As correcting means of the spherical aberration, for example, an expander lens is generally used. FIG. 4 shows an example of a construction of the expander lens. The expander lens is constructed by a lens in two groups of a convex lens 1500 and a concave lens 1501 and has a function of enlarging a light flux of incident parallel light and emit it as parallel light again. The concave lens 1501 held in a lens holder 1505 is in engagement with a lead screw 1503 which is rotated by a stepping motor 1502 through a rack 1504. The concave lens 1501 is moved in the optical axial direction by a predetermined movement amount by the stepping driving of the stepping motor 1502.

The other end of the lens holder 1505 is supported by a guide axis 1506. A light shielding plate 1508 to detect a home position of the concave lens 1501 by a photointerrupter 1507 is attached to the lens holder 1505. When a cover layer thickness of disk changes and the spherical aberration occurs, by moving the concave lens of the expander lens along the optical axis, the light flux which is emitted is deviated from parallel light, an angle at which the light enters the objective lens changes, and the generated spherical aberration can be cancelled.

Figure 5:
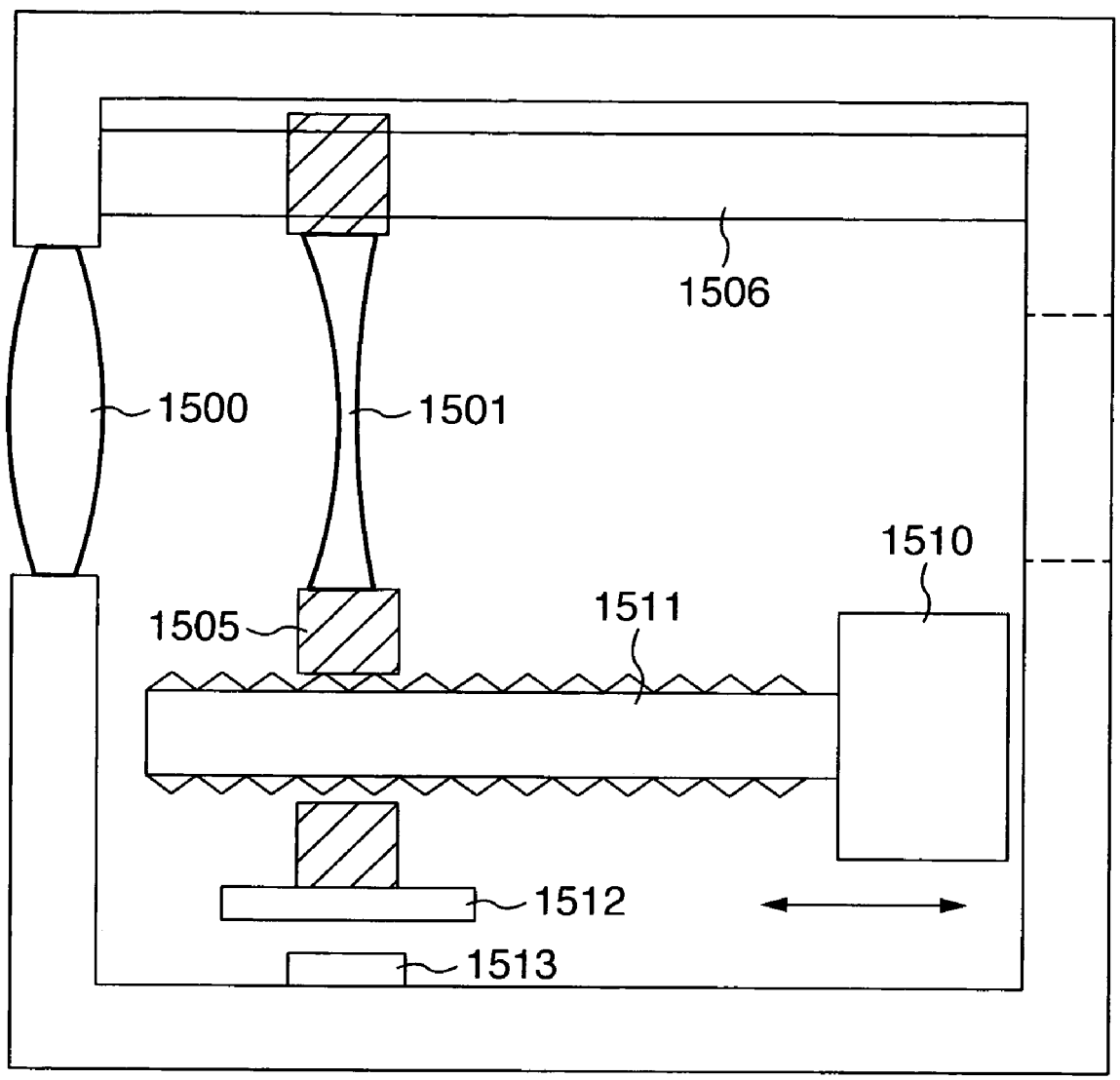
FIG. 5 is a diagram showing an example of a construction of an expander lens using a piezoelectric element.

FIG. 5 is shows a drive mechanism of an expander lens using a smooth impact drive mechanism (SIDM) using a piezoelectric element as a drive mechanism of the expander lens. The same component elements as those in FIG. 4 are designated by the same reference numerals and their explanation is omitted here. A piezoelectric element 1510 is expanded and contracted in the directions shown by arrows. A rod 1511 coupled with the piezoelectric element 1510 is deformed in the directions shown by the arrows in accordance with the expansion and contraction of the piezoelectric element. The surface of the rod 1511 has a proper friction. The position of the lens holder 1505 is held by the friction.

Since the rod is deformed by the expansion and contraction of the piezoelectric element, the lens holder 1505 is moved. A permanent magnet 1512 has been attached to the lens holder 1505. By detecting a change in magnetic field by a hall sensor 1513, a position sense signal POS showing the position of the lens holder 1505, that is, the position of the concave lens 1501 is outputted. The position of the concave lens 1501 can be controlled on the basis of the position sense signal POS.

Since the position of the lens whose aberration is corrected differs depending on the cover layer thickness of the disk, it is necessary to discriminate the kind of disk set in the optical disk apparatus and move the position of the lens to a different position in accordance with the kind of CD/DVD/BD.

The kind of disk can be discriminated by a method whereby, for example, a laser corresponding to the disk kind is turned on, the expander lens is moved to the spherical aberration correcting position corresponding to the disk kind, the actuator is vertically moved in the focusing direction, and a level of the signal detection by the reflection light on the information recording surface is detected.

A method of discriminating the kind of disk will now be described with reference to FIGS. 6, 7, and 8.

Figure 6:
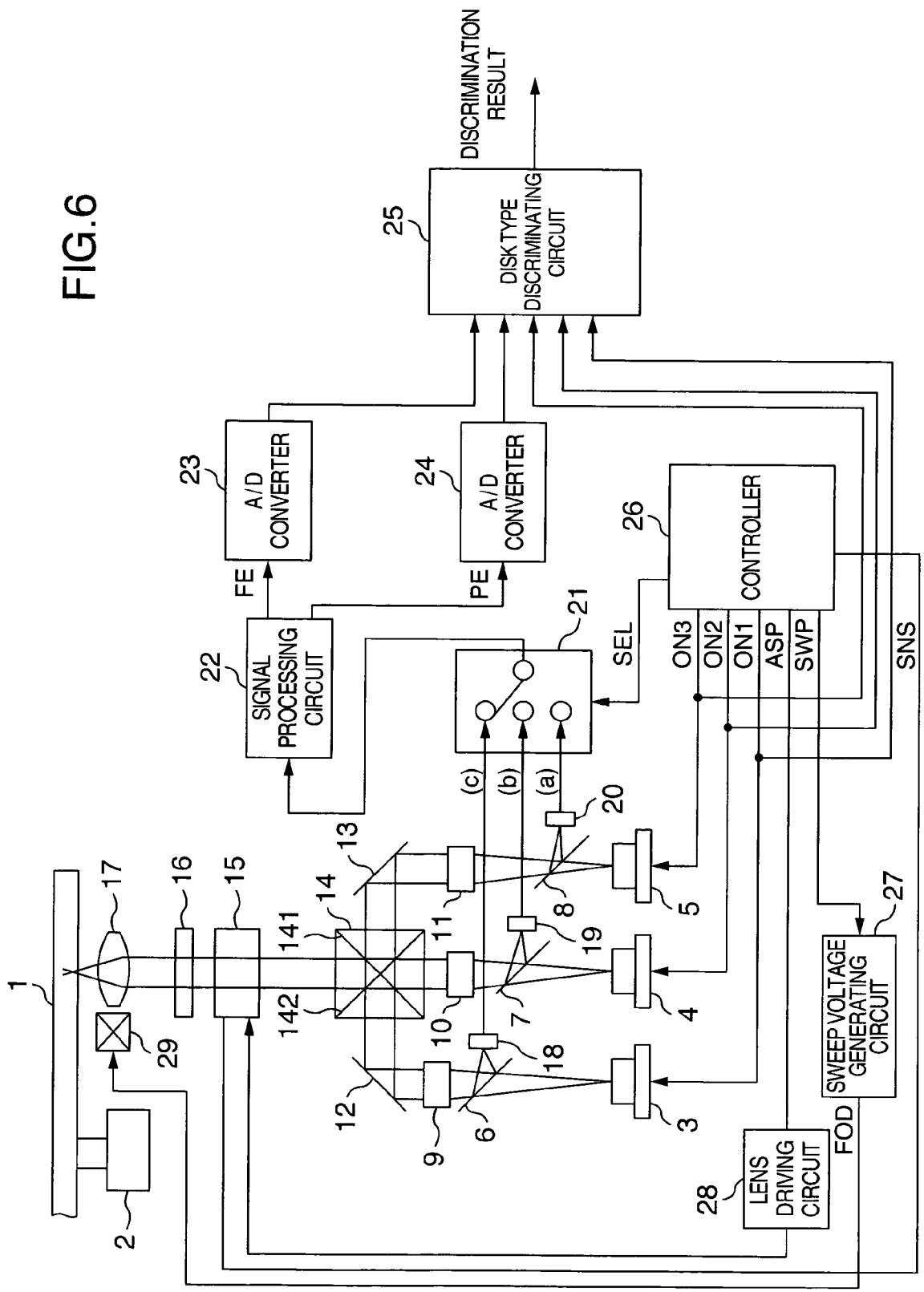
FIG. 6 is a block diagram showing an example of a construction of the optical disk apparatus.

In FIG. 6, the reading, erasure, and writing of information are executed to an optical disk 1 by irradiation of a laser beam and the disk 1 is rotated by a spindle motor 2.

A laser diode 3 emits the laser beam having a wavelength of 780 nm for a CD. Its light flux passes through a beam splitter 6, is waveform shaped into a parallel light flux by a collimate lens 9, is reflected by a mirror 12 and a reflecting surface 141 of a dichroic mirror 14, passes through an expander lens 15 and a quarter-wave retardation plate 16, and thereafter, is focused onto a recording surface of the optical disk 1 by an objective lens 17. The reflection light passes along a path similar to the outward path, is reflected by the beam splitter 6, and enters a photo detector 18.

A laser diode 4 emits the laser beam having a wavelength of 650 nm for a DVD. Its light flux passes through a beam splitter 7, is waveform shaped into a parallel light flux by a collimate lens 10, passes through the dichroic mirror 14, the expander lens 15, and the quarter-wave retardation plate 16, and thereafter, is focused onto the recording surface of the optical disk 1 by the objective lens 17. The reflection light passes along a path similar to the outward path, is reflected by the beam splitter 7, and enters a photo detector 19.

A laser diode 5 emits the laser beam having a wavelength of 405 nm for a BD. Its light flux passes through a beam splitter 8, is waveform shaped into a parallel light flux by a collimate lens 11, is reflected by a mirror 13 and a reflecting surface 142 of the dichroic mirror 14, passes through the expander lens 15 and the quarter-wave retardation plate 16, and thereafter, is focused onto the recording surface of the optical disk 1 by the objective lens 17. The reflection light passes along a path similar to the outward path, is reflected by the beam splitter 8, and enters a photo detector 20.

The objective lens 17 is a 3-wavelength corresponding lens whose numerical aperture (NA) changes in accordance with the wavelengths of 780 nm, 650 nm, and 405 nm. In this instance, a multifocal objective lens whose focal position differs in dependence on the laser beams of a plurality of wavelengths.

The photo detector 18 outputs a signal corresponding to the disk reflection light of the laser diode 3 for the CD. Its output signal is connected to an input terminal (a) of a switch 21. The photo detector 19 outputs a signal corresponding to the disk reflection light of the laser diode 4 for the DVD. Its output signal is connected to an input terminal (b) of the switch 21. The photo detector 20 outputs a signal corresponding to the disk reflection light of the laser diode 5 for the BD. Its output signal is connected to an input terminal (c) of the switch 21. It is assumed that each of the photo detectors 18 to 20 has a current-to-voltage converting circuit (not shown) and outputs a voltage signal corresponding to the reflection light amount.

The switch 21 switches the input signals at the input terminals (a), (b), and (c) in response to a switching signal SEL which is outputted from the controller 26 and outputs the switched signal. Its output signal is connected to a signal processing circuit 22. The signal processing circuit 22 forms an FE signal showing a focus error and a total light amount signal PE showing a total reflection light amount from the optical disk 1 from the signal selected by the switch 21 and supplies them to analog to digital (A/D) converters 23 and 24, respectively. A circuit 25 for discriminating a type of an optical disk discriminates the type of optical disk 1 by using the output signals of the signal processing circuit 22 by a method, which will be explained hereinafter, and outputs a discrimination result. A controller 26 outputs the signal SEL to control the switching operation of the switch 21 mentioned above.

Further, the controller 26 supplies control signals ON1, ON2, and ON3 to control ON/OFF of the light emission of the laser diodes 3 to 5 to the laser diodes. In the example, it is assumed that by setting each of the control signals to the high level "H", each laser diode emits the light. The controller 26 also outputs a control signal SWP to control a sweep voltage generating circuit 27 and a control signal ASP to control a lens driving circuit 28. The sweep voltage generating circuit 27 outputs a control signal FOD to control the driving of a focus actuator 29. In the example, it is assumed that when a level of the FOD signal is set to the low level "L", the objective lens 17 is away from the optical disk 1 and when the level of the FOD signal is set to the high level "H", the objective lens 17 approaches the optical disk 1.

In the following description, the operation in which the objective lens 17 approaches the optical disk 1 is called "up-sweep" and, on the contrary, the operation in which the objective lens 17 is away from the optical disk 1 is called "down-sweep". The lens driving circuit 28 drives the expander lens 15 in the optical axial direction on the basis of the ASP signal which is outputted from the controller 26 and instructs the spherical aberration correcting position. In the case of using the stepping motor as a moving mechanism of the expander lens 15, the motor is rotated by the amount corresponding to the number of steps based on the ASP signal.

The disk kind discriminating operation will now be described with reference to a flowchart shown in FIG. 7 and an operation waveform diagram shown in FIG. 8 regarding the optical disk apparatus of FIG. 6.

The disk kind discriminating process shown in FIG. 7 is assumed to be a disk kind discriminating process A. When the disk kind discriminating process is started, first, the position of the expander lens 15 is moved to a home position P0 (step S000 in FIG. 7). When the expander lens 15 has been located at the home position P0, a home position detection signal SNS from the photointerrupter 1507 to detect the home position is set to "H" (time t0 in FIG. 8). Subsequently, the down-sweep is started so that the objective lens 17 is away from the optical disk 1 (S001 in FIG. 7, time t0 in FIG. 8). The controller 26 monitors whether or not the SWP signal has reached a predetermined driving bottom point (S002 in FIG. 7).

If the SWP signal does not reach the lower limit point (NO in S002), the controller 26 continues the monitoring. When the SWP signal has reached the lower limit point, the down-sweep is stopped and ON1="H" is set, thereby turning on the laser corresponding to the CD (S003 in FIG. 7, time t1 in FIG. 8). Subsequently, the expander lens is moved to a position P1 corresponding to the CD (S004 in FIG. 7). When the expander lens has been moved to the position P1, the controller 26 starts the up-sweep in such a direction as to allow the objective lens 17 to approach the optical disk 1. At the same time, the disk type discriminating circuit 25 starts the measurement of amplitudes from the data of the FE signal and the PE signal which are inputted from the A/D converters 23 and 24 (S005 in FIG. 7, time t2 in FIG. 8). The controller 26 monitors whether or not the SWP signal has reached a predetermined driving top point (S006 in FIG. 7).

If the SWP signal does not reach the upper limit point (NO in S006), the controller 26 continues the monitoring. When the SWP signal has reached the upper limit point, the up-sweep is stopped and the measurement of the amplitudes of the FE signal and the PE signal is stopped (S007 in FIG. 7). The disk type discriminating circuit 25 compares the measured FE amplitude and PE amplitude with predetermined threshold values FEth and PEth (S008 in FIG. 7). If the FE amplitude and PE amplitude exceed the threshold values, it is determined that the loaded disk is the CD (S009 in FIG. 7) and a discrimination signal is outputted. If the FE amplitude and PE amplitude are equal to or less than the threshold values, the controller 26 restarts the down-sweep so that the objective lens 17 is away from the disk 1 (S010 in FIG. 7, time t3 in FIG. 8). The controller 26 monitors whether or not the SWP signal has reached the predetermined driving bottom point (S011 in FIG. 7). If the SWP signal does not reach the lower limit point (NO in S011), the controller 26 continues the monitoring.

Figure 8:
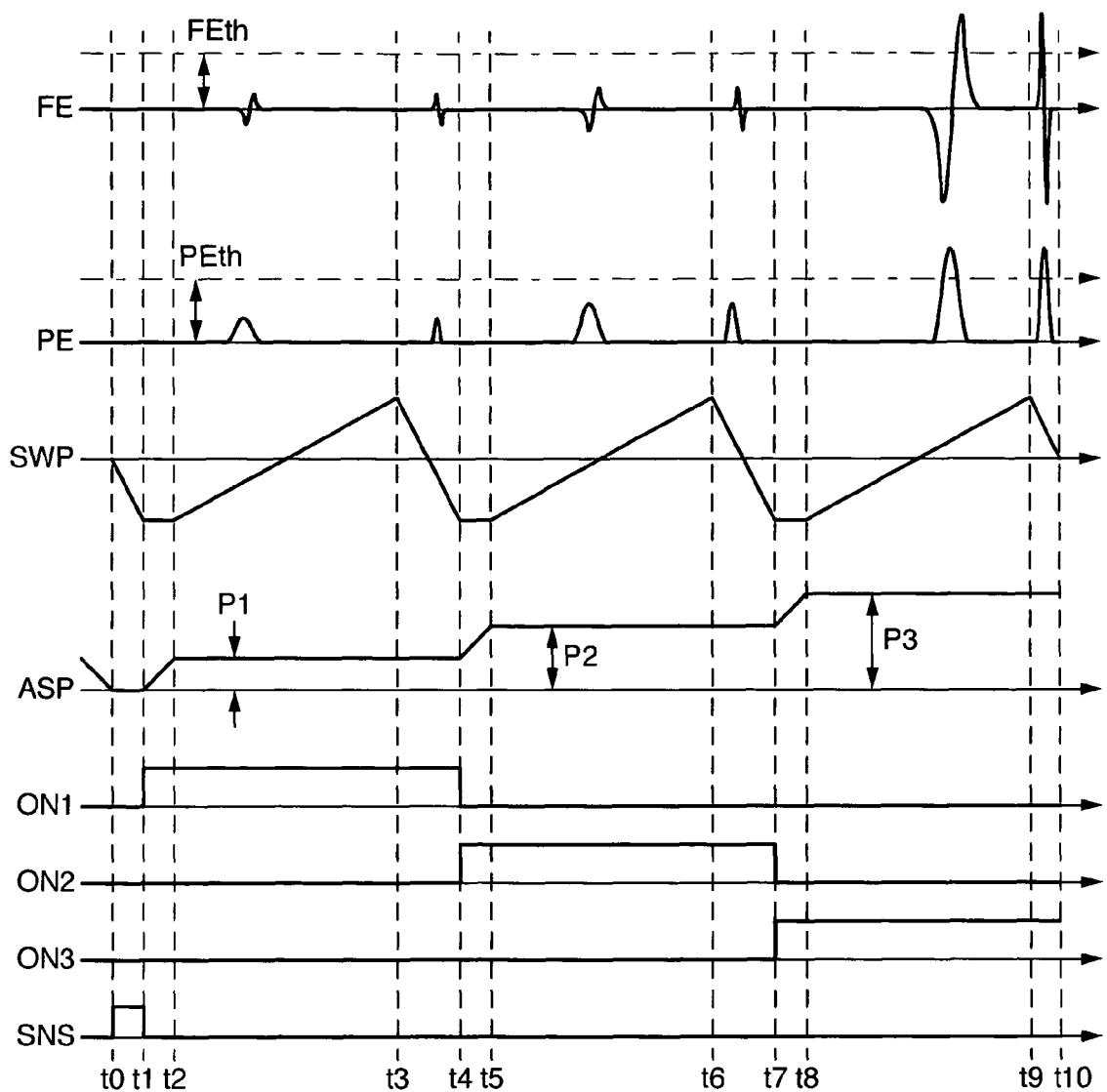
FIG. 8 is a waveform diagram showing the operation of the disk kind discriminating process.

When the SWP signal has reached the lower limit point, the down-sweep is stopped and ON2="H" is set, thereby turning on the laser corresponding to the DVD (S012 in FIG. 7, time t4 in FIG. 8). Subsequently, the expander lens is moved to a position P2 corresponding to the DVD (S013 in FIG. 7). When the expander lens has been moved to the position P2, the controller 26 starts the up-sweep in such a direction as to allow the objective lens 17 to approach the disk 1. At the same time, the disk type discriminating circuit 25 starts the measurement of the amplitudes from the data of the FE signal and the PE signal which are inputted from the A/D converters 23 and 24 (S014 in FIG. 7, time t5 in FIG. 8). The controller 26 monitors whether or not the SWP signal has reached the predetermined driving top point (S015 in FIG. 7).

If the SWP signal does not reach the upper limit point (NO in S015), the controller 26 continues the monitoring. When the SWP signal has reached the upper limit point, the up-sweep is stopped and the measurement of the amplitudes of the FE signal and the PE signal is also stopped (S016 in FIG. 7). The disk type discriminating circuit 25 compares the measured FE amplitude and PE amplitude with the predetermined threshold values FEth and PEth (S017 in FIG. 7). If the FE amplitude and PE amplitude exceed the threshold values, it is determined that the loaded disk is the DVD (S018 in FIG. 7) and a discrimination signal is outputted. If the FE amplitude and PE amplitude are equal to or less than the threshold values, the controller 26 restarts the down-sweep so that the objective lens 17 is away from the disk 1 (S019 in FIG. 7, time t6 in FIG. 8). The controller 26 monitors whether or not the SWP signal has reached the predetermined driving bottom point (S020 in FIG. 7). If the SWP signal does not reach the lower limit point (NO in S020), the controller 26 continues the monitoring.

When the SWP signal has reached the lower limit point, the down-sweep is stopped and ON3="H" is set, thereby turning on the laser corresponding to the BD (S021 in FIG. 7, time t7 in FIG. 8). Subsequently, the expander lens is moved to a position P3 corresponding to the BD (S022 in FIG. 7). When the expander lens has been moved to the position P3, the controller 26 starts the up-sweep in such a direction as to allow the objective lens 17 to approach the disk 1.

At the same time, the disk type discriminating circuit 25 starts the measurement of the amplitudes from the data of the FE signal and the PE signal which are inputted from the A/D converters 23 and 24 (S023 in FIG. 7, time t8 in FIG. 8). The controller 26 monitors whether or not the SWP signal has reached the predetermined driving top point (S024 in FIG. 7). If the SWP signal does not reach the upper limit point (NO in S024), the controller 26 continues the monitoring. When the SWP signal has reached the upper limit point, the up-sweep is stopped and the measurement of the amplitudes of the FE signal and the PE signal is also stopped (S025 in FIG. 7).

The disk type discriminating circuit 25 compares the measured FE amplitude and PE amplitude with the predetermined threshold values FEth and PEth (S026 in FIG. 7). If the FE amplitude and PE amplitude exceed the threshold values, it is determined that the loaded disk is the BD (S027 in FIG. 7) and a discrimination signal is outputted. If the FE amplitude and PE amplitude are equal to or less than the threshold values, it is determined that there is no disk (S028 in FIG. 7). Discrimination results are outputted in steps S009, S018, S027, and S029. After that, the controller 26 starts the down-sweep so that the objective lens 17 is away from the disk 1 (S029 in FIG. 7, time t9 in FIG. 8). The controller 26 monitors whether or not the SWP signal has reached a predetermined driving middle point (S030 in FIG. 7). If the SWP signal does not reach the middle point (NO in S030), the controller 26 continues the monitoring. When the SWP signal has reached the middle point, the down-sweep is stopped (S031) and the disk kind discriminating process A is finished.

The disk kind discriminating process according to the invention will now be described with reference to flowcharts of FIGS. 1 and 2.

Figure 1:
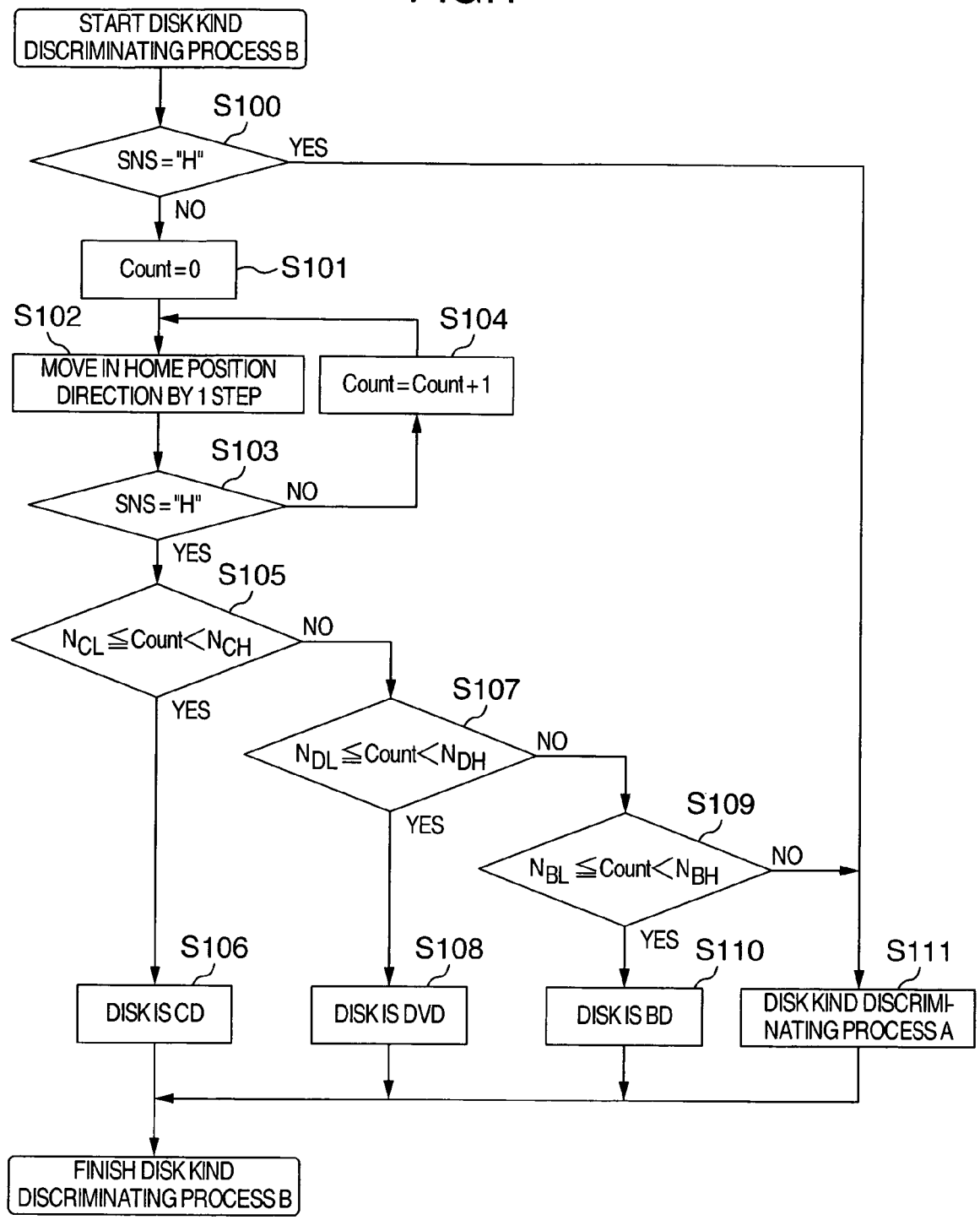
FIG. 1 is a flowchart showing the first embodiment of the invention.

In FIG. 1, the disk kind discriminating process according to the invention is assumed to be a disk kind discriminating process B. In the disk kind discriminating process, first, the home position detection signal SNS of the expander lens 15 is confirmed (S100). If the home position detection signal SNS is at the "H" level, this means that the expander lens 15 is located at the home position, it is regarded that the disk 1 has been exchanged as will be explained hereinafter, and the disk kind discriminating process A shown in the flowchart in FIG. 7 is executed (S111).

If the home position detection signal SNS is at the "L" level, it is determined that the expander lens 15 is not located at the home position and the disk 1 is not exchanged as will be explained hereinafter. By using the stepping motor as a moving mechanism of the expander lens 15, even if a power source is OFF, the expander lens 15 can be held at the position of the expander lens corresponding to the kind of disk to which the reproduction and recording have previously been executed. The number of steps up to the home position is obtained to detect the holding position.

First, a counter to obtain the number of steps up to the home position is cleared (S101). Subsequently, the expander lens is moved in the home position direction by one step (S102). After it was moved, a level of the home position detection signal SNS is checked (S103). If the home position detection signal SNS is at the "L" level, this means that the expander lens does not reach the home position, and "1" is added to a count value of the counter (S104). The processing routine is returned to the process for moving again the expander lens in the home position direction by one step (S102).

The processes of steps S102, S103, and S104 are repeated until the home position detection signal SNS is set to the "H" level. The count value of the counter at the time when the home position detection signal SNS is set to "H" shows the number of steps in a range from the home position to the position of the expander lens corresponding to the kind of disk 1 to which the reproduction has previously been executed. Therefore, the kind of disk to which the reproduction and recording have previously been executed is discriminated by comparing the count value of the counter with a predetermined value corresponding to the disk kind. The count value is compared with predetermined values NCL and NCH (S105). If it lies within a range between those values, it is decided that the disk is the CD (S106), and the disk kind discriminating process is finished.

If the count value is out of the range between NCL and NCH, it is compared with predetermined values NDL and NDH (S107). If it lies within a range between NDL and NDH, it is determined that the disk is the DVD (S108), and the disk kind discriminating process is finished. If the count value is out of the range between NDL and NDH, it is compared with predetermined values NBL and NBH (S109). If it lies within a range between NBL and NBH, it is determined that the disk is the BD (S110), and the disk kind discriminating process is finished. If the count value is out of the range between NBL and NBH, it is determined that the position of the expander lens 15 has been deviated due to abnormality such as some shock, turn-off of the power source during the moving process of the expander lens 15, or the like, and the disk kind discriminating process A is executed.

Figure 2:
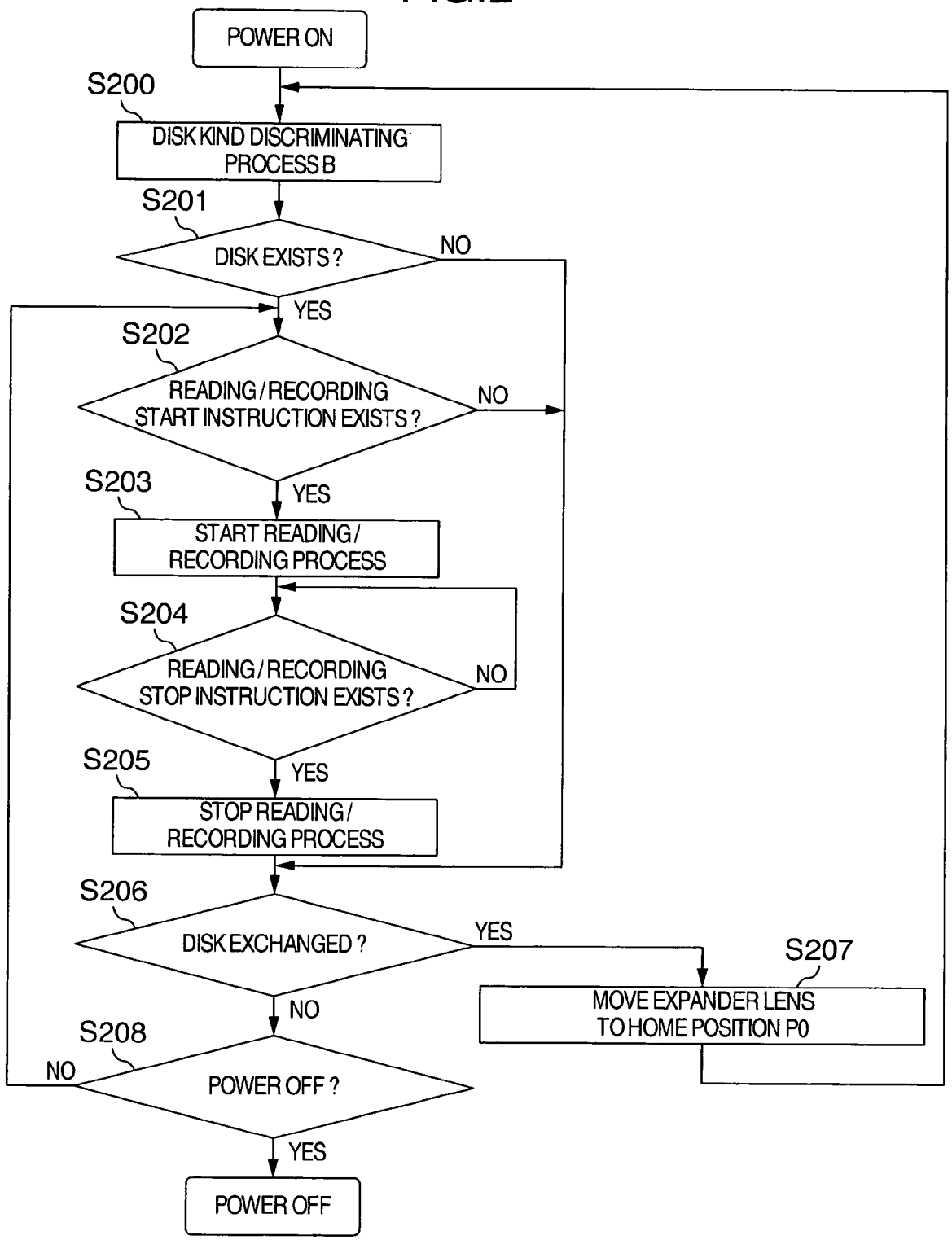
FIG. 2 is a flowchart showing the operation of an optical disk apparatus using the first embodiment of the invention.

FIG. 2 is the flowchart showing the operation of the optical disk apparatus using the disk kind discriminating process of FIG. 1.

When the power source of the optical disk apparatus is turned on in FIG. 2, first, the disk kind discriminating process B is executed (S200). If it is decided in discriminating step S201 that the disk exists as a result of the disk kind discriminating process B (YES in S201), the processing routine advances to next discriminating step S202. If it is decided that there is no disk (NO in S201), the processing routine advances to discriminating step S206. If there is a reading/recording start instruction in discriminating step S202 (YES in S202), the reading/recording process is started (S203). If there is no reading/recording start instruction (NO in S202), the processing routine advances to discriminating step S206. If there is no reading/recording stop instruction in step S204 (NO in S204), the reading/recording process is continued. If the reading/recording stop instruction exists (YES in S204), the reading/recording process is stopped (S205).

If it is decided in discriminating step S201 that there is no disk (NO in S201), if there is no reading/recording start instruction in discriminating step S202, and if it is decided in discriminating step S206 that there is a disk exchange instruction after the stop of the reproduction and recording, the expander lens is moved to the home position P0 (S207). After the expander lens was moved there, the processing routine is returned to the disk kind discriminating process B and the kind of the exchanged disk is discriminated (S200). Since the expander lens has already been moved to the home position P0 in step S207, in the disk kind discriminating process B, the home position detection signal SNS is at the "H" level (SNS="H") in first discriminating step S100. Therefore, it is decided that the disk has been exchanged, and the disk kind discriminating process A is executed (S111).

When there is no disk exchange instruction in discriminating step S206, if the power source is not OFF in next discriminating step S208, the processing routine is returned to discriminating step S202 of discriminating the presence or absence of the reading/recording start instruction.

In the above processes, since the expander lens is moved to the home position P0 only when the disk is exchanged, if there is no abnormality such as a shock or the like and the disk is not exchanged, the expander lens position corresponding to the disk to which the reproduction and recording have previously been executed has been held. The time necessary to move the expander lens 15 and the time necessary to vertically move the objective lens 17 in the focusing direction as in the disk kind discriminating process A are unnecessary. The kind of disk can be discriminated for almost the time which is required for the expander lens home position moving process (S000) in the disk kind discriminating process A.

Figure 3:
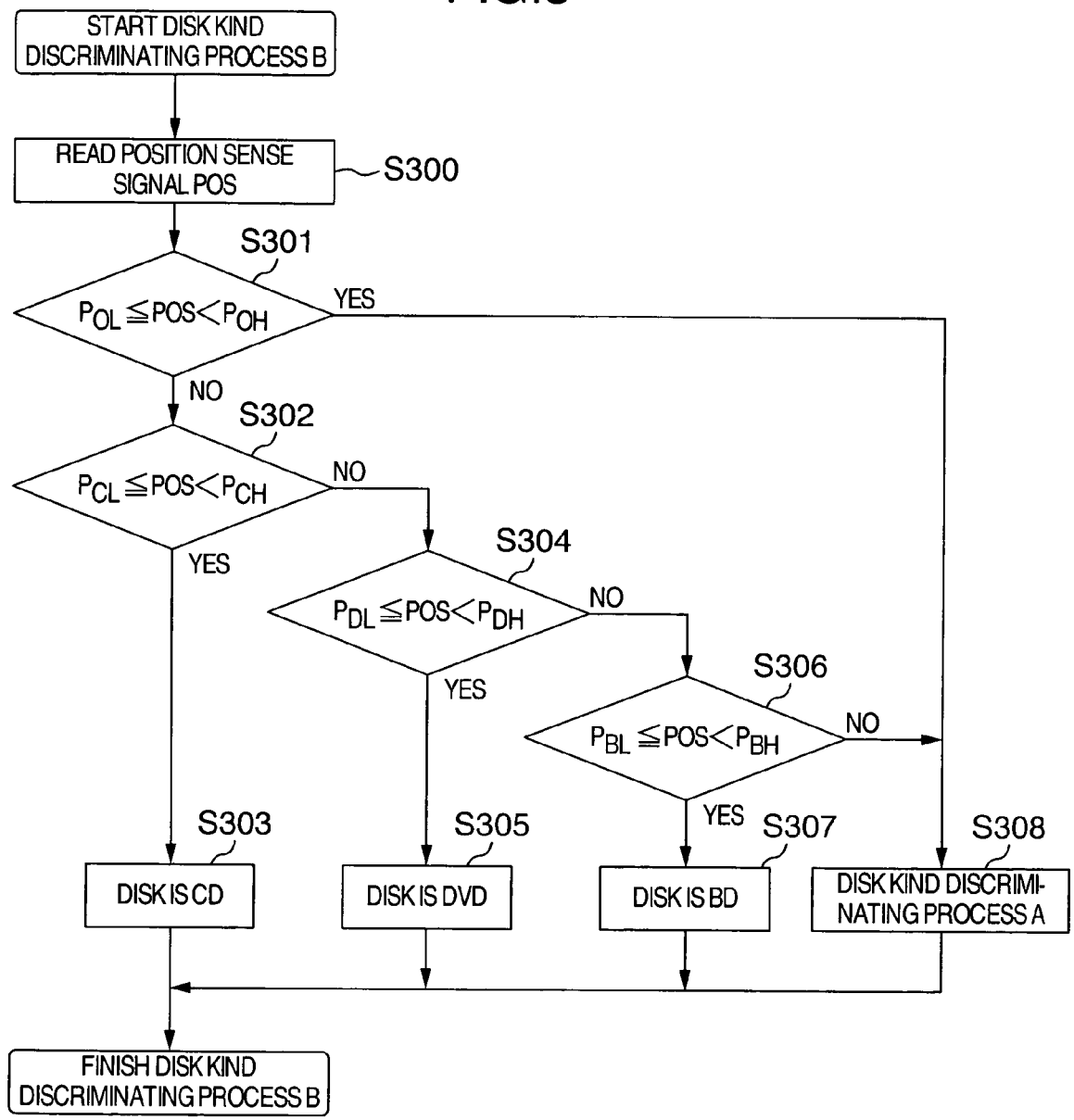
FIG. 3 is a flowchart showing the second embodiment of the invention.

FIG. 3 is a flowchart showing the second embodiment of the invention using the piezoelectric element as a drive mechanism of the expander lens in FIG. 5.

First, the level of the position sense signal POS is read in order to detect the position of the expander lens 15 (S300). The level of the position sense signal POS is compared with predetermined values $P_{OL}$ and $P_{OH}$ (S301). If it lies within a range between $P_{OL}$ and $P_{OH}$ (YES in S301), this means that the expander lens 15 is located at the home position. It is regarded that the disk 1 has been exchanged, and the disk kind discriminating process A shown in the flowchart of FIG. 3 is executed (S308). If the level of the position sense signal POS is out of the range between $P_{OL}$ and $P_{OH}$ (NO in S301), the expander lens 15 is not located at the home position and it is decided that the disk 1 is not exchanged. In next step S302, the level of the position sense signal POS is compared with predetermined values PCL and $P_{CH}$. If it lies within a range between PCL and $P_{CH}$ (YES in S302), it is decided that the disk is the CD (S303), and the processing routine is finished. If the level is out of the range (NO in S302), it is compared with predetermined values $P_{DL}$ and $P_{DH}$ (S304). If it lies within such a range (YES in S304), it is decided that the disk is the DVD (S305), and the processing routine is finished.

If the level of the position sense signal POS is out of the range between $P_{DL}$ and $P_{DH}$ (NO in S304), it is compared with predetermined values $P_{BL}$ and $P_{BH}$ (S306) If it lies within a range between $P_{BL}$ and $P_{BH}$ (YES in S306), it is decided that the disk is the BD (S307), and the processing routine is finished. If the level is out of the range between $P_{BL}$ and $P_{BH}$ (NO in S306), it is determined that the position of the expander lens 15 has been deviated due to abnormality such as some shock, turn-off of the power source during the moving process of the expander lens 15, or the like, and the disk kind discriminating process A is executed (S308).

In the second embodiment, since the position can be detected merely by reading the level of the position sense signal POS without moving the expander lens as in the case where the stepping motor is used, the disk kind can be discriminated in a shorter time in the case where there is no abnormality such as a shock or the like and the disk is not exchanged.

Although the example in which the stepping motor or the piezoelectric element is used as a moving mechanism of the expander lens has been shown in the embodiments, the invention is not limited to such an example but it is sufficient to use a self-holding possible mechanism even if the power source is turned off. Although the position of the expander lens has been detected by the number of steps until the home position is detected or by the hall sensor, the invention is not limited to such an example but another method may be used. Although the levels of the focus error signal FE and the total reflection light amount signal PE have been used to discriminate the disk kind in the disk kind discriminating process A, the invention is not limited to such an example but it may be also detected by using only either the focus error signal FE or the total reflection light amount signal PE.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of discriminating a kind of an optical disk among a plurality of different kinds of optical disks in an optical disk apparatus comprising a plurality of laser sources of different wavelengths, an actuator which moves an objective lens towards or away from a recording surface of an optical disk, a spherical aberration correction device which corrects spherical aberration using a moving mechanism, a correction position detector which detects a spherical aberration correction position of the spherical aberration correction device, and an optical detector which detects a reflected light from an optical disk, the method comprising:
when the spherical aberration correction position is at a predetermined home position, using a first discrimination method in which: while the objective lens is being moved towards or away from the recording surface of an optical disk, a plurality of laser beams are sequentially irradiated onto the optical disk one after another by being switched from one laser beam to another; at the same time as the switching of the laser beams to be irradiated onto the optical disk, spherical aberration correction is made for each laser beam by the spherical aberration correction device so that the spherical aberration is corrected for each of the laser beams of the plurality of the laser sources; a reflected light from the optical disk by irradiation of each laser beam is detected; a signal is generated from the each reflected light; and using the signals, the kind of the disk is discriminated among the plurality of the optical disks; and
when the spherical aberration correction position is not at the predetermined home position, using a second discrimination method in which the spherical aberration correction position is compared with predetermined positions corresponding to the respective kinds of the optical disks to discriminate the kind of the optical disk among the plurality of kinds of the optical disks.

2. The method of discriminating according to claim 1, wherein when no agreement with any of the aberration correction positions of the optical disk is found in the second discrimination method, the first discrimination method is used.

3. An optical disk apparatus comprising:
one or more laser sources arranged to irradiate a plurality of laser beams of different wavelengths;
an objective lens;
an actuator which moves the objective lens towards or away from a recording surface of an optical disk;
a spherical aberration correction device which corrects a spherical aberration for each laser beam using a moving mechanism;
a correction position detector which detects a spherical aberration correction position of the spherical aberration correction device;
an optical detector which detects a reflected light from the optical disk;
a drive circuit which drives the laser sources, the actuator and the spherical aberration correction device;
a signal processing circuit which generates a signal from each reflected light detected by the optical detector; and
a system control unit which controls the drive circuit to move the actuator relative to the optical disk so as to move the objective lens, which controls the laser sources to irradiate the laser beams of different wavelengths, which controls the spherical aberration correction device to correct the spherical aberration, and which discriminates the kind of the optical disk from the signal generated by the signal processing circuit and an output of the correction position detector,
wherein, when the spherical aberration correction position is at a predetermined home position, discrimination of the kind of optical disk is made using the signal generated by said signal processing circuit and, when the spherical aberration correction position is not at the predetermined home position, discrimination of the kind of optical disk is made using the spherical aberration correction position of the spherical aberration correction device.

4. The optical disk apparatus according to claim 3, wherein, when discrimination of the kind of optical disk cannot be made from the spherical aberration correction position of the spherical aberration correction device, discrimination of the kind of optical disk is made using the signal generated by the signal processing circuit.

5. An optical disk apparatus comprising:
one or more laser sources arranged to emit a plurality of laser beams of different wavelengths for different types of optical disks;
an objective lens arranged to move towards or away from a recording surface of an optical disk;
an expander lens arranged to correct a spherical aberration caused in each laser beam;
a signal processor arranged to generate signals based on each reflected light from the optical disk; and
a system controller arranged to control movement of the objective lens and the expander lens to correct the spherical aberration, to control the laser sources to emit the laser beams of different wavelengths, and to discriminates a type of optical disk based on the signals generated from the signal processor and a spherical aberration correction position of the expander lens,
wherein, when the spherical aberration correction position is at a predetermined home position, the system controller discriminates the type of optical disk based on the signals generated from the signal processor and, when the spherical aberration correction position is not at the predetermined home position, the system controller discriminates the type of optical disk based on a comparison between the spherical aberration correction position of the expander lens relative to predetermined positions corresponding to different types of optical disks.

6. The optical disk apparatus to claim 5, wherein, when discrimination of the type of optical disk cannot be made from the spherical aberration correction position of the expander lens, discrimination of the type of optical disk is made using the signals generated by the signal processor.

7. The optical disk apparatus to claim 5, wherein the different types of optical disks include a compact disc (CD), a digital video disc (DVD), and a Blu-ray (Bd), and the laser sources include a first laser diode to emit a laser beam having a wavelength of 780 nm for use with a CD, a second laser diode to emit a laser beam having a wavelength of 650 nm for use with a DVD, and a third laser diode to emit a laser beam having a wavelength of 405 n for use with a Bd.

8. The optical disk apparatus to claim 5, further comprising:
a stepping motor or a piezoelectric element arranged to move the expander lens,
wherein the system controller is further configured to detect the spherical aberration correction position of the expander lens before discriminating the type of optical disk.

9. A method of discriminating a kind of optical disk in an optical disk apparatus in which a spherical aberration is corrected by a spherical aberration correcting unit and said spherical aberration correcting unit is moved by a moving mechanism in an optical pickup in accordance with a cover layer thickness of an optical disk, the method comprising:
detecting a correcting position of said spherical aberration correcting unit;
keeping a position of said spherical aberration unit when a power source of the optical disk apparatus is turned "OFF"; and
if the position of said spherical aberration unit is kept at a position other than a predetermined home position when the power source is turned "ON", discriminating the kind of optical disk on the basis of the correcting position of said spherical aberration correcting unit kept when the power source is turned "ON".

10. The method according to claim 9, wherein the correcting position of said spherical aberration unit is moved to the predetermined home position when the optical disk is exchanged.

11. The method according to claim 9, wherein, when the position of said spherical aberration unit is kept at the predetermined home position when the power source is turned ON, discriminating the kind of the optical disk based on a reflection light with moving said spherical aberration unit.

* * * * *